Figure 1:
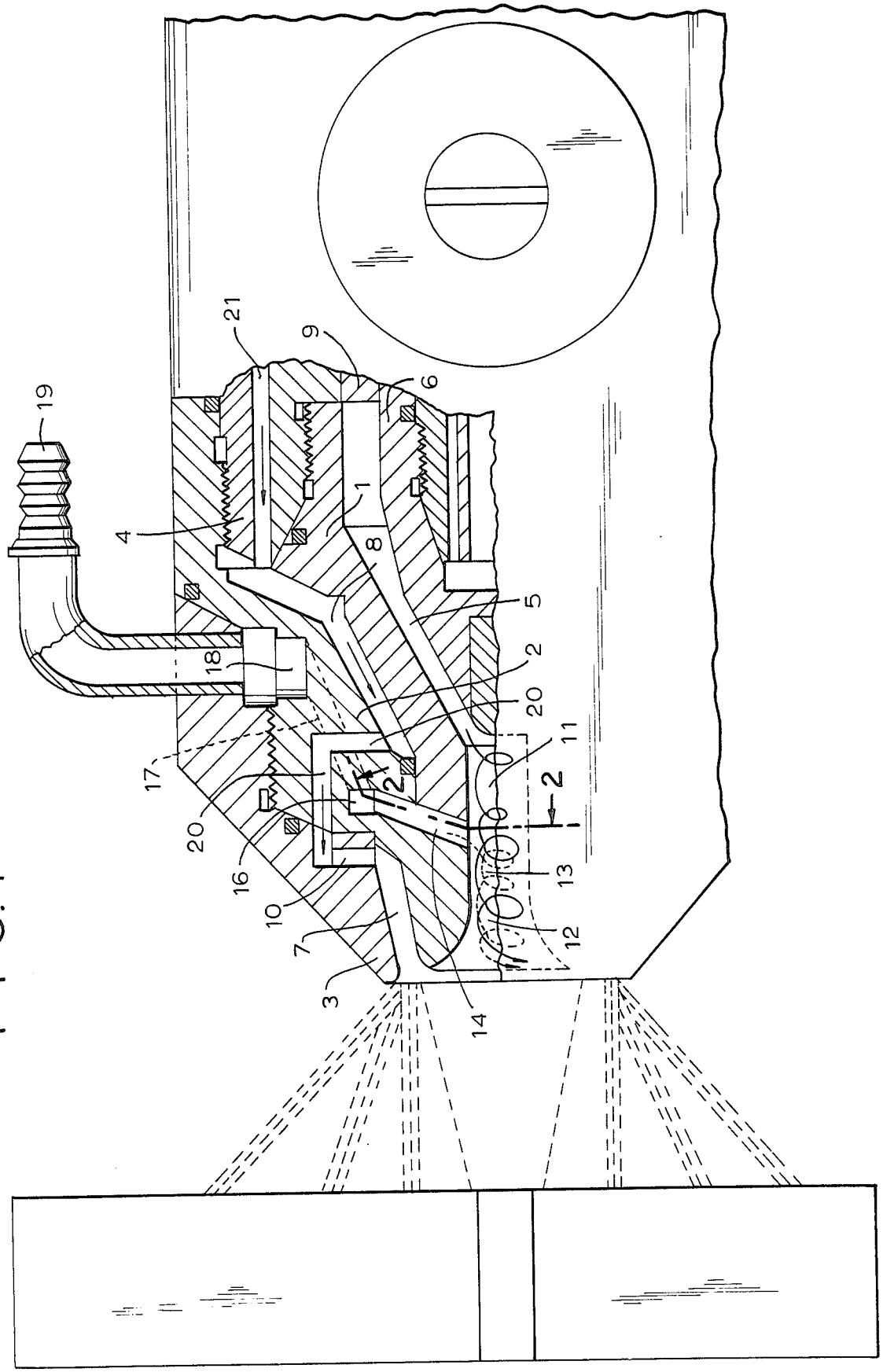

United States Patent [19]

Garlanov et al.

[11] Patent Number: 4,743,734
[45] Date of Patent: May 10, 1988

[54] NOZZLE FOR PLASMA ARC TORCH

[75] Inventors: Dimo T. Garlanov; Sergey I. Angelov, both of Sofia,, Bulgaria

[73] Assignee: N P K za Kontrolno Zavarachni Raboti, Sofia, Bulgaria

[21] Appl. No.: 734,443

[22] Filed: May 15, 1985

[51] Int. Cl.$^4$ ............................................. B23K 9/00
[52] U.S. Cl. .................. 219/121 PP; 219/121 PQ; 219/75; 219/121 PM
[58] Field of Search .............. 219/121 P, 121 PM, 74, 219/75, 76.16, 121 PP, 121 PQ, 121 PN, ; 313/231.31, 231.41, 231.51

[56] References Cited

U.S. PATENT DOCUMENTS

| | | | |
|---|---|---|---|
| 3,534,388 | 10/1970 | Ito et al. | 219/121 PP |
| 3,536,885 | 10/1970 | Mitchell | 219/121 PQ |
| 3,641,308 | 2/1972 | Couch, Jr. et al. | 219/121 PP |
| 4,163,891 | 8/1979 | Komatsu et al. | 219/121 PQ |
| 4,311,897 | 1/1982 | Yerushalmy | 219/121 PP |
| 4,421,970 | 12/1983 | Couch, Jr. | 219/121 PP |
| 4,521,666 | 6/1985 | Severence et al. | 219/121 PP |

Primary Examiner—M. H. Paschall

[57] ABSTRACT

Nozzle for plasma arc torch includes internal and external forming nozzles mounted one within other and fitted to the torch housing to form first and second gaps. The first gap is formed between the torch cathode and the internal nozzle, an internal vortex generator mounted in it. An external vortex generator is fitted in the second gap and is connect to races machined in the torch housing. A forming canal is designed in the front end of the internal nozzle and an intermediary nozzle is mounted between the internal and external nozzles. A third gap is formed between it and the internal nozzle, and the second gap is formed between the intermediary and the external nozzles. A second forming race coaxial with that of the internal nozzle is provided in the front part of the intermediary nozzle, thus forming a common forming race. An intermediary vortex generator with tangential races is included in the contact surface of the intermediary and internal nozzles. The tangential races are connected by their ends to the common forming race, and to an internal circular race on the intermediary nozzle. This race is connected by holes to an external circular race connected with a pipe connection. The second gap is connected to the housing races by means of the external vortex generator, connecting races of the intermediary nozzle and third gap. The connecting races are designed above the intermediary vortex generator.

2 Claims, 2 Drawing Sheets

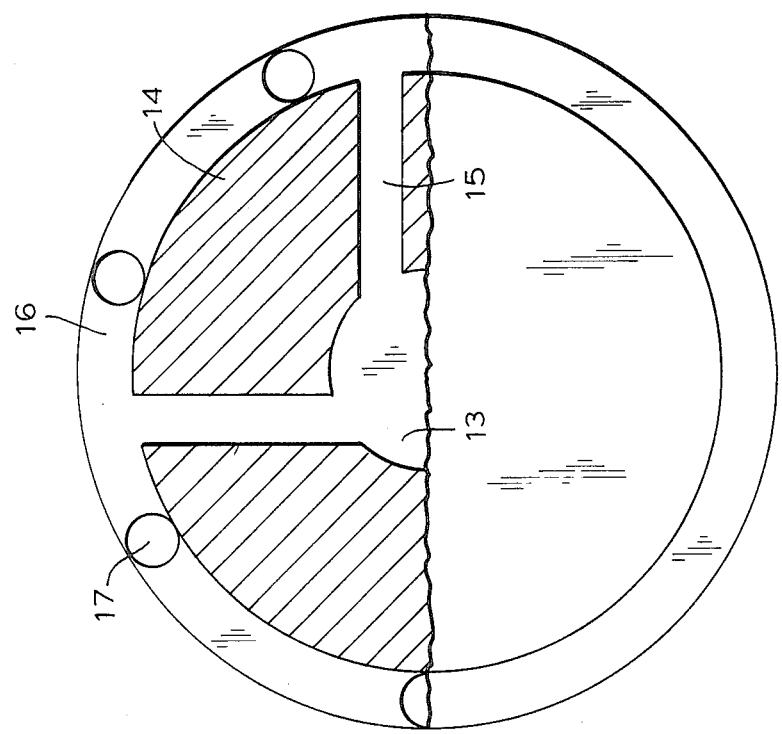

NOZZLE FOR PLASMA ARC TORCH

This invention is related to a nozzle for a plasma arc torch and finds application in plasma treatment of materials in the air and under the water.

A nozzle for a plasma arc torch is known, (Bulgarian Author's Certificate No. 29,754) especially for independent feeding of water flow and plasma-forming gas, including an external and an internal forming nozzle mounted one over the other and fitted to the housing of the plasma arc torch in such a way as to form two gaps. The first gap is between the cathode and the internal forming nozzle designed for feeding plasma-forming gas; an internal vortex generator is mounted in it. The second gap is formed between the internal forming nozzle and the external forming nozzle designed for feeding the water flow. The front part of the second gap is in the shape of concentric hole, and its back side is connected with races machined in the plasma arc torch housing. An external vortex generator is fitted under the level of the races—along the external surface of the internal forming nozzle. A forming race is disposed in the front part of the internal forming nozzle.

A disadvantage of this nozzle is that it cannot simultaneously and independently feed both inert and oxygen-containing plasma-forming gases directly and straight into the forming race. Another disadvantage is that the consumption of the inert gases: argon, hydrogen, nitrogen, helium and their mixtures, considerably increases when the thickness of the cut of the material is increased, or the depth of sinking is increased together with the increase of the power of the plasma nozzle. This makes plasma cutting of standard steels over a certain thickness more expensive per linear meter of cut than that of oxyacetylene cutting.

This invention provides a component nozzle for a plasma arc torch which guarantees the simultaneous and independent supply of inert and oxygen-containing plasma-forming gas directly and straight into its forming race, thereby to reduce the consumption of inert plasma-forming gas.

The nozzle of the invention includes an internal and an external forming nozzle mounted one over the other and fitted to the plasma arc torch housing in such a way as to form a first and a second gap. The first gap is formed between the plasma arc torch cathode and the internal forming nozzle; an internal vortex generator is mounted in it. An external vortex generator is fitted in the second gap and it is connected to races machined in the plasma arch torch housing. A forming canal is designed in the front end of the internal forming nozzle. According to this invention, an intermediary forming nozzle is mounted between the internal and the external forming nozzle. A third gap is formed between it and the internal forming nozzle, and the second gap is formed between the intermediary and the external forming nozzle. A second forming race coaxial with that of the internal forming nozzle is provided in the front part of the intermediary forming nozzle, thus forming a common forming race. An intermediary vortex generator with tangential races is included in the contact surface of the intermediary and the internal forming nozzle. The above tangential races are connected by one their ends to the common forming race, and by the other are connected to an internal circular race on the intermediary forming nozzle. This race is connected by holes to an external circular race connected with a pipe connection. The second gap is connected to the housing races by means of the external vortex generator, connecting races of the intermediary forming nozzle and third gap. The connecting races are designed above the intermediary vortex generator.

The advantages of the nozzle are as follows:

the simultaneous and independent supply of inert and oxygen-containing plasma-forming gas and a water flow is guaranteed thus reducing the inert gas consumption; and Its design permits cutting of parts with great thickness both in the air and under water with considerable depth of submerging.

A preferred example of the nozzle of the invention is shown in the attached drawings wherein:

FIG. 1 is a partial section of a nozzle of the invention mounted on a plasma arc torch; and FIG. 2 is a view in section along line 2—2 in FIG. 1.

The nozzle of the invention consists of an internal nozzle 1, an intermediate nozzle 2, and an external nozzle 3, mounted one within the other. The nozzles are fixed to the housing 4 of the plasma arc torch in such a way as to form three gaps. The first gap 5 is disposed between cathode 6 of the plasma arc torch and the external forming nozzle 1. The second gap 7 is located between the intermediate 2 and the external 3 forming nozzles. The third gap 8 is formed between the internal nozzle 1 and the intermediate forming nozzle 2. An internal vortex generator 9 is mounted in the first gap 5, and an external generator 10 is mounted in the second gap 7, fitted in the middle external part of the intermediate forming nozzle 2. A forming race 11 is disposed in the front part of the internal forming nozzle 1, coaxially connected to second forming race 12, located in the intermediate forming nozzle 2 so that a common forming race 13 is formed. The above forming races 11 and 12 can have different diameters and lengths. An intermediate vortex generator 14 is included in the contact surface of gap 2 and the internal forming nozzle 1, having tangential races 15 which can be inclined at different angles towards the axis of the common forming race 13. Tangential races 15 at one of their ends are connected to the common forming canal 13, and at the other are connected to internal circular race 16 formed on the intermediary forming nozzle 2. In its turn, the internal circular race 16, is connected by holes 17 to external circular race 18, and is connected to pipe connection 19. The external circular canal 18 can be also machined in gap 2 an in the external forming nozzle 3. The second gap 7, by means of the external vortex generator 10, connecting races 20 of the intermediate nozzle 2 and the third gap 8, is connected to races 21 machined in housing 4 of the plasma arc torch. Connecting races 20 are fitted above the intermediate vortex generator 14.

The above-described nozzle operates as follows:

Inert gas of specified quantity (discharge) is fed tangentially by means of the internal vortex generator 9 traveling along the first gap 5 with accelerating velocity, enters the forming race 11 of the internal forming nozzle 1 and continues along the common forming race 13. The cooling water flow fed across races 21 in housing 4 enters the third gap 8 cooling the internal 1 and intermediate 2 forming nozzles. The water flow then flows into connecting races 20 and, continuing the cooling of intermediate forming nozzle 2, is transferred to the second gap 7 above the external vortex generator 10. Traveling across the latter, the water flow acquires rotary and translational motion and continues the cooling of the intermediate nozzle 2 and the external forming nozzle 3. In the second gap 7 the flow runs at an accelerating velocity directed outwards to its hole. Running out of the hole, the water flow forms a protection conical water screen in front of the plasma arc torch of changing controllable shape. The plasma arc torch is moved to the material to be cut, electric current is fed between the nozzle and the cathode 6, and the pilot arc is ignited by means of a mnaual starting device, automatically by an oscillator, or a pneumatic button, and the arc is automatically directed against the treated material. Simultaneously with the increasing energy parameters of the arc, and oxygen-containing flow is automatically released across pipe connection 19 with a flow rate considerably exceeding that of the inert gas. This flow travels into the external circular race 18, across holes 17, and travels into the internal circular canal 16 of the intermediate vortex generator 14. Thence, along tangential races 15 it enters the common forming race 13 affecting the generated plasma flow along its length changing its gas dynamic, energy and heat parameters.

Although the invention is described and illustrated with reference to a single embodiment thereof, it is to be expressly understood that it is in no way limited to the disclosure of such preferred embodiments but is capable of numerous modifications within the scope of the appended claims.

We claim:

1. Nozzle for plasma arc torch including an internal forming nozzle and an external forming nozzle mounted one within the other and fixed to a plasma arc torch housing in such a way as to form a first and a second gap, the first gap being between the plasma arc torch cathode and an internal forming nozzle in which an internal vortex generator is mounted, an external vortex generator fitted in the second gap, the second gap being connected to races machined in the plasma arc torch housing and a forming race machined in the front part of the internal forming nozzle, said nozzle comprising an intermediate nozzle mounted between the internal nozzle and the external forming nozzle and between the intermediate nozzle and the internal forming nozzle there is formed a third gap, said second gap being formed between said third gap and the external forming nozzle, in the front part of the intermediate forming nozzle there is disposed a second forming race coaxial with the forming race of the internal forming nozzle where a common forming race is formed, in the contact surfaces of the second gap and the internal forming nozzle there is an intermediary vortex generator having tangential races connected by their one ends with the common forming race and by their other ends are connected to an external circular race connected by a pipe connection, the second gap is connected to the races in the housing by means of the external vortex generator connecting the races of the intermediate forming nozzle and third gap.

2. Nozzle according to claim 1, wherein the connecting races of the intermediate forming nozzle are situated outside the intermediate vortex generator.

* * * * *